March 24, 1970  A. W. SPENCER  3,502,757
METHOD OF CONTROLLING CONTAMINANT BUILDUP ON EXTRUSION
DIES USED IN CASTING THERMOPLASTIC SHEETING
Filed Jan. 20, 1967
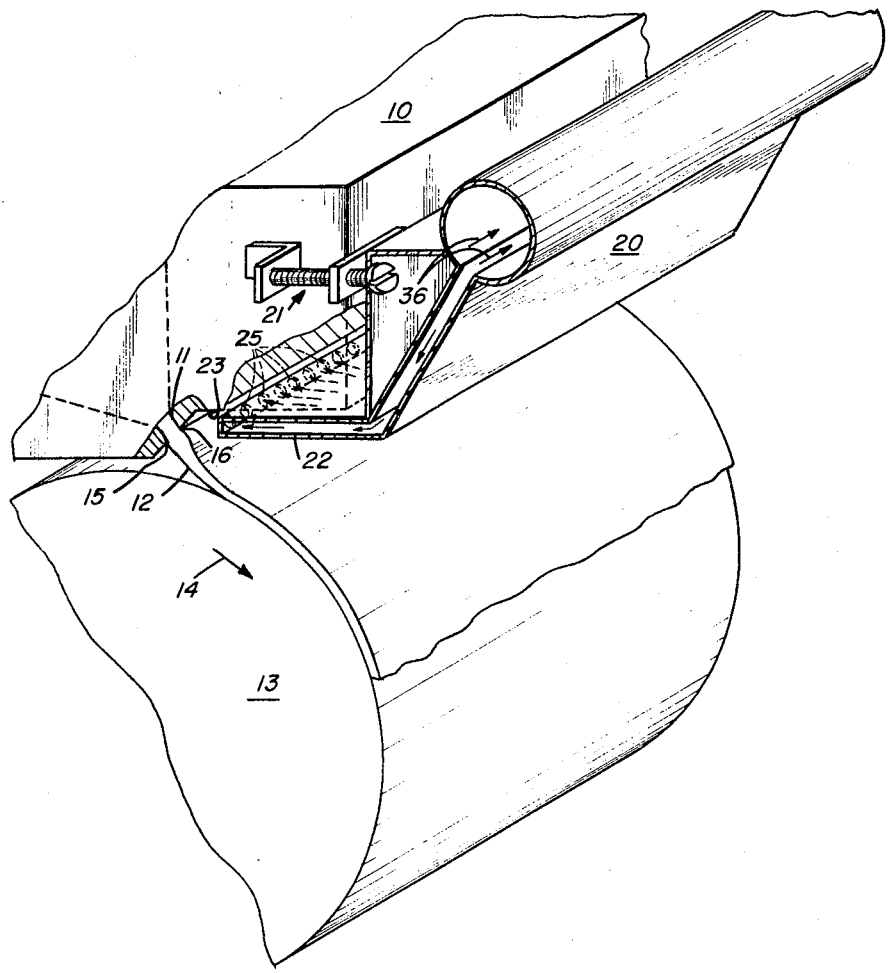
ARTHUR W. SPENCER
INVENTOR.
BY
ATTORNEYS

United States Patent Office 3,502,757
Patented Mar. 24, 1970

3,502,757
METHOD OF CONTROLLING CONTAMINANT BUILDUP ON EXTRUSION DIES USED IN CASTING THERMOPLASTIC SHEETING
Arthur W. Spencer, Rochester, N.Y., assignor to Eastman Kodak Company, Rochester, N.Y., a corporation of New Jersey
Filed Jan. 20, 1967, Ser. No. 610,605
Int. Cl. B29f 3/03, 3/08; B29d 7/00
U.S. Cl. 264—89                                           8 Claims

ABSTRACT OF THE DISCLOSURE

A method of extruding a polymeric thermoplastic material which includes the step of accurately directing small quantities of clean gas wherein the said gas is selected from the group consisting of filtered air, carbon dioxide and nitrogen, against one or both sides of the extruded sheet in the vicinity of the extrusion die orifice to sweep any vaporous and low molecular constituents away from the metal surfaces of the die adjacent to the die orifice before they can condense or solidify thereon and build up to cause die lines in the extruded sheet.

---

This invention relates to melt casting of polymeric thermoplastic materials, and particularly to the casting of sheeting or film materials.

The extrusion of thermoplastics through restricted die openings is often attended by a buildup of material on the external surfaces of the extrusion die. These accumulations of material may adversely affect the quality of the extrudate particularly if they occur adjacent to the perimeter of the extrusion orifice. In the case of film and sheeting, the material collecting along the length of, and adjacent to, the die orifice can cause a defect in the surface of the cast sheet or film known as a die line. Such a die line results from a sharply irregular wetting contact at the corner of the die orifice where the extruded sheet breaks contact with the metal of the die orifice. The buildup of foreign materials adjacent to the die orifice provides sites for such irregular wetting contact. This foreign material can take several forms and can be caused by many different phenomena. In the case of flat sheeting, such a buildup of foreign material at the two ends of the orifice can cause ragged and non-uniform edges on the extruded sheet.

While there are many recognized sources for the foreign materials that cause die lines and/or ragged and unsharp edges and/or other defects in the extruded sheet, one of the most difficult to control is the slowly accumulating buildups directly adjacent to the orifice. The prior art teaches that the flowing thermoplastic instead of flowing directly from the sharp edges of the die orifice can wet a small surface of the orifice immediately adjacent to these edges due to flow fluctuations, temperature changes, melt expansion forces, and other reasons. The plastic that wets these external areas becomes degraded and decomposed and, of course, gradually accumulates to form the foreign material site for die line defects.

Attempts to overcome this undesirable buildup of foreign materials that cause die lines have been many and varied in nature. One of the most widely used has been to provide the leaving edges of the die orifice with razor sharp edges in an attempt to discourage run back of the extrudate on the external surfaces due to capillary action. Also attempts have been made to maintain an atmosphere around the vicinity of the die orifice which tends to prevent the solidification and accumulation of any small amounts of extrudate which might tend to wet the external surfaces of the die orifice. An example of this is in the film casting art where solvent type dopes are the extrudate and any dope which tends to run back and wet the external surface tends to solidify and form what are known in the art as slugs because of the evaporation of solvent therefrom. In an effort to prevent this formation of slugs an atmosphere of solvent vapor is maintained about the exit orifice of the hopper.

I have found that certain polymeric thermoplastics including polyamides, polycarbonates, and polyesters, and more particularly, polyethylene terephthalate, give up various vaporous and low molecular constituents in a "flash" type of process at the instant that the material which is extruded under pressure is exposed or reduced to atmospheric pressure as it leaves the die orifice. In the case of polyethylene terephthalate, these vaporized constituents include thermal degradation by-products ranging from several aldehyde forms, terephthalic acid, monomeric and dimeric ethylene terephthalate, and others. While it is not fully understood, some of these materials apparently recondense and/or solidify on the metal surface of the die externally of and immediately adjacent to the orifice. Presumably this deposit of foreign material is associated with the high concentration of these contaminants in the area directly adjacent to the extruding plastic. This phenomenon of the condensing and/or solidifying of a vaporous contaminant is difficult to verify. However, I have found, quite surprisingly, that if the contaminated air in the immediate vicinity of the extrusion orifice is replaced with clean air, the gradual buildup of foreign materials near the orifice is drastically reduced, and in many cases eliminated entirely.

Accordingly, the primary object of the present invention is in the extrusion of a polymeric thermoplastic material to eliminate or minimize the accumulation of foreign material around the extrusion orifice that cause die lines or related effects in the extruded sheet by removing any vaporous and low molecular constituents which may evolve from the extrudate by reason of its being reduced to atmospheric pressure before they can be sublimed onto the leaving edges of the extrusion orifice.

Another object is to employ small quantities of accurately directed air, preferentially temperature controlled, against one or both sides of the extruded sheet in the vicinity of the extrusion die orifice to sweep any vaporous constituents away from the metal surfaces adjacent to the orifice slot before they can collect thereon.

Yet another object is to direct air against only one side of the extruded sheet and to simultaneously apply a reduced pressure to the other side of the extruded sheet so that the air will be drawn around the edges of the extruded sheet and over the ends of the extrusion die orifice to sweep any vaporous polymeric constituents away from the metal surfaces adjacent the ends of the orifice before they can collect thereon.

The novel features that I consider characteristic of my invention are set forth with particularity in the appended claims. The invention itself, however, both as to its details of construction and its methods of operation, together with additional objects and advantages thereof, will best be understood from the following description when read in connection with the accompanying drawings, in which the figure is a perspective view, partly in section, illustrating an apparatus for carrying out the present invention.

The present invention provides a process for preventing the formation and buildup of solidified and degraded polymer constituents on the leaving edges of the extrusion orifice through which a sheet of molten polymeric thermoplastic is extruded which comprises impinging a blast of clean gas against the full width of at least one surface of the extrudate at the instant of its exposure to atmospheric environment, and supplying said gas at such a rate as to sweep away from the leaving edge of the extrusion orifice any vaporous and low molecular constituents which might evolve from the extrudate by reason of its being exposed to atmospheric pressure before they can become sublimed on the leaving edge of the extrusion orifice.

The gas used is preferably air, but carbon dioxide or nitrogen may be preferred for those polymeric materials which are more susceptible to oxidation.

Referring now to the drawing, a molten highly polymeric thermoplastic is extruded under pressure from a die or hopper 10 having a relatively long and narrow discharge orifice 11 to form a thin sheet 12. The extruded sheet 12 is then deposited onto the polished surface of a chilled casting wheel 13 which is rotated clockwise as indicated by the directional arrow 14. Within one revolution of the casting wheel the sheet is substantially cured or cooled to be stripped therefrom for further processing as is well known. That edge or corner 15 of the die orifice 11 which is first approached by the casting wheel is generally designated the rear edge of the orifice while the other edge or corner 16 is known as the front edge.

It has been discovered that the buildup of foreign material occurs two or three times more rapidly on the front edge 16 of the die orifice 11 than on the rear edge 15. It has also been discovered that with similar contaminant buildup on the two edges of the die orifice, the influence on the sheet quality due to the contaminant buildup on the front edge 16 of the orifice is considerably more pronounced than that due to the contaminant buildup on the rear edge 15.

It is believed that these observations relate to the geometry of the extrusion die to wheel arrangement, and to the melt expansion phenomena which exists at the extrusion orifice. As shown in the drawing, extrusion dies or hoppers employed for casting film or sheeting may have their discharge orifice 11 arranged to discharge the extrudate at substantially a 45° angle with respect to the tangent at the top surface of the casting wheel 13. Immediately upon extrusion from the orifice the polymer swells momentarily during the melt expansion phenomena as illustrated in exaggerated form in the drawing, and then is drawn down into the thinner desired thickness by the wheel speed. The extruded sheet passes considerably closer to the front edge 16 of the orifice than it does the rear edge 15. This closer proximity caused by geometry coupled with the melt expansion apparently causes a more rapid rate of contamination buildup on the front edge 16 of the orifice. In addition, once this buildup occurs, the incidence and severity of the die line generation from the buildup is greatly increased over defects being produced on the underside of the extruded sheet.

According to the present invention small quantities of clean heated gas (air) are accurately impinged at the polymeric extrudate at the instant of exposure to atmospheric environment to sweep away the air in the immediate vicinity of the extrusion orifice which is contaminated by the vaporous and low molecular constituents given up by the polymer in a "flash" type of process the instant the material is exposed to atmospheric pressure. Continuous removal of this contaminated air has been found to drastically reduce, and in many instances, entirely eliminate, the gradual buildup of foreign materials near the extrusion orifice.

To this end, with a sheet casting apparatus such as shown in the drawing clean filtered air is fed into the end of an air distribution plenum 20, as shown by the directional arrows 36, fixed to the die by an adjusting mechanism 21 so that it can be adjusted to and from the extrusion orifice for reasons which will be set out below. This plenum 20 terminates in a narrowed-down air sweep nozzle portion 22 which extends substantially the full width of the extruded sheet and is, as shown, disposed substantially horizontally to the bottom wall 23 of the die and the uppermost surface of the sheet 12 of extrudate deposited on the wheel. While different types of openings can be provided in the end of the air sweep nozzle 22 to obtain a proper and uniform distribution of air across the entire length of the discharge orifice 11 of the die, it has been found that $\frac{1}{16}''$ holes 25 on $\frac{3}{32}''$ centers perform satisfactorily. In order to adequately sweep the contaminated air from the environment of the hopper discharge orifice, the air must issue from the air sweep nozzle at as high a velocity as is practical. The maximum velocity of the air will depend upon the distance the nozzle is spaced from the extruded sheet and upon the thickness and character of the extruded sheet. For instance, the air issuing from the air sweep nozzle should not impinge upon the sheet in such a manner and with such force as to deform the surface of the sheet. Also, it will be understood that thicker sheets of extrudate can withstand higher impingement velocities of the air than thin sheets of extrudate without being broken thereby or having its exposed surface adversely deformed by the air stream. It is also conceivable that the physical properties of the particular polymer being extruded will to some extent dictate the velocity of air which may be tolerated. The distance of the air sweep nozzle from the discharge orifice of the die will also affect the velocities of air which can be used.

Accordingly, in order to accommodate the extrusion of different polymers at different thicknesses the air sweep nozzle 22 should be adjustably mounted on the die, or some other support, so that its discharge orifice or orifices can be adjusted from $\frac{1}{4}''$ to $5''$ from the die discharge orifice. The volume of air supplied to the plenum 20 should be adjusted so that the linear velocities of the air issuing from the air sweep nozzle can be adjusted in accordance with the particular type and thickness of the extrudate being handled. Also, means, not shown, should be provided to heat the air issuing from the air sweep nozzle to control its temperature within a certain range. This can be done by placing thermocouple controlled heaters in the plenum chamber or by heating the air prior to its introduction into the plenum, such means not being shown for the reason that it may be conventional and well known in the art. It has been found necessary to heat the air because to use cold air permits or may aggravate the buildup of solidified thermoplastic and/or foreign material on the front edge 16 of the discharge orifice 11. The use of too hot air, e.g. much above the melting temperature of the polymer being extruded should be avoided since it might tend to char any of the extrudate or the vaporous contaminants flashed therefrom tending to accumulate on the edges of the die discharge slot. A preferred range of temperatures for the air for polyethylene terephthalate is from 400° F. to 650° F.

Equipment of the type disclosed using a 15" wide plenum with the air sweep nozzle 22 spaced $\frac{1}{2}''$ from the die discharge orifice 11 and fed with approximately 12 c.f.m. of 400° F. air was used in the production of 4 and 2½ mil thick sheeting made from polyethylene terephthalate at 530° F. Under the particular conditions of these operations, an extrusion die without the hot air sweep developed objectionable die lines in two to six days on five consecutive occasions. The next five operating periods with all principal conditions similar except for the addition of a hot air sweep did not develop die lines at all. Some of these operating periods extended up to twenty days.

The economy and practicability of die line control by the use of this air sweep can be further illustrated by considering the extra cost or waste caused by a shortened operated period. While detracting from the quality of the product, some die lines can be tolerated in the finished sheeting. However, when the frequency and severity of such die lines increases, a complete clean up of the extrusion die area is required. Upon examination of production records from a 4 mil sheeting production unit using polyethylene terephthalate as the polymer it was found that die lines caused waste equal to approximately 2½% of total production for the two month period preceding the use of a hot air sweep according to the present invention. Die line waste for a similar period after installation of hot air sweep equipment was less than 0.5%.

It will be appreciated that the wider the extruded sheet the larger the air distribution plenum 20 and air sweep nozzle 22 that will be required to sweep the contaminated air from the environs of the extrusion die. Accordingly, the volume of air fed into the plenum to produce the desired linear velocities of the air issuing from the air sweep nozzle will vary with the width of the distribution plenum and the design of the air sweep nozzle associated therewith. For this reason the values of the volume of air fed into the distribution plenum has little significance so far as the process is concerned, but it is more significant to consider the linear velocity of the air issuing from the air sweep nozzle. While, as mentioned above, the linear velocity of the air issuing from the air sweep nozzle may vary depending upon the type of polymer being extruded, the thickness of the extrudate and the spacing of the air sweep nozzle from the extrusion die, I have found that in the production of 4 to 2½ mil polyethylene terephthalate sheeting, and with the air sweep nozzle spaced approximately ½" from the extrusion die orifice a preferred range of linear velocities is 4,000–7,000 feet per minute. These linear velocities are calculated at the air sweep nozzle but will, in fact, remain the same for approximately ⅜ of an inch of travel. The velocity of air which is actually impinging upon the extrusion orifice will be in this range or possibly somewhat less depending upon the spacing of the air sweep nozzle.

Rather than leaving the ends of the casting wheel open to allow the contaminated air to be swept away from the environs of the extrusion die orifice solely by deflection of the air from the edge of the die orifice and the surface of the extruded sheet, it has been found most helpful in some cases, e.g. where wide sheets are being extruded, to provide exhaust facilities, not shown, around the peripheral and "back wash" areas of the die to carry the contaminated air away from the casting area. In this connection, in order to prevent the buildup of foreign material at the ends of the die orifice which might be conducive to the formation of ragged edges on the extruded sheet, it might be desirable to sweep the contaminated air away from the ends of the extrusion orifice as well as away from the long edge thereof. This can readily be done without the use of an additional air sweep nozzle(s) by merely encasing the ends and the surface of that portion of the casting wheel approaching the extrusion die with a close fitting housing, not shown, and applying a vacuum thereto. This reduction of pressure on the underside of the extruded sheet will draw the air from the air sweep nozzle 22 around the ends of the extruded sheet 12 and over the ends of the extrusion orifice to sweep any contaminated air from this environment.

Should the buildup of contaminant on the rear edge 15 of the extrusion orifice 11 become a problem then it might be desirable or necessary to place an air sweep nozzle on the other side of the extruded sheet to sweep away the contaminated air from the rear edge 15 of the extrusion orifice. An example of a case where an air sweep on both sides of the extruded sheet might be particularly useful would be the die extrudes vertically onto the top of the casting wheel rather than at an angle as shown in the drawing. In such a case the buildup of contaminant, and the incidence and severity of die lines, might be more equal on both sides of the extrusion orifice.

I claim:
1. A process for reducing the formation of die lines and other defects in a sheet of film formed by extruding a molten highly polymeric thermoplastic under pressure through an elongated, narrow extrusion orifice and into an environment maintained substantially at atmospheric pressure, said process comprising the steps of impinging a blast of clean gas wherein the said gas is selected from the group consisting of filtered air, carbon dioxide and nitrogen, against the full width of at least one surface of the extruded sheet at the instant it leaves said orifice and is exposed to atmospheric pressure; and supplying said gas at such a rate as to sweep away from the leaving edge of the extrusion orifice any vaporous and low molecular weight constituents which might evolve from the extrudate, by reason of its being exposed and reduced to atmospheric pressure, before they can become sublimed on the leaving edges of the extrusion orifice.

2. A process according to claim 1 in which the thermoplastic polymeric material is polyethylene terephthalate.

3. A process according to claim 1 in which the extruded film is deposited onto and taken way from the extrusion orifice by a moving casting surface transversely of which said extrusion orifice extends, and in which the blast of clean gas is impinged only against that surface of the extruded sheet leaving that transverse edge of the extrusion orifice which is spaced from the other transverse edge in the direction of movement of the extruded sheet as it is conveyed from said orifice by the casting surface.

4. A process according to claim 3 including the step of reducing the pressure on the other side of the extruded sheet adjacent the extrusion orfiice to a value below atmospheric pressure to pull said gas impinged onto the first side of the sheet around the ends of said sheet and thereby prevent contaminant buildup on the ends of said extrusion orifice.

5. A process according to claim 1 in which a blast of clean gas is impinged against the full width of both surfaces of the extruded sheet at the instant of its exposure to atmospheric pressure.

6. A process according to claim 1, in which the blast of gas is heated to a temperature between 400° F. and 650° F. and is impinged against the sheet in a manner and at a velocity such that it will not permanently deform the surface of said sheet.

7. A process according to claim 1, in which said gas is distributed through like size holes equally spaced across the length of said extrusion orifice and mutually adjustable from ¼" to 5" relative to said orifice.

8. A process for eliminating or reducing the formation of die lines and other defects in a sheet of film formed by extruding a molten highly polymeric thermoplastic under pressure through an elongated, narrow extrusion orifice and into the atmosphere, said process comprising the step of forcefully removing by a blast of clean air any vaporous and low molecular weight constituents which may evolve from the extrudate by reason of its being reduced to atmospheric pressure before they can become sublimed onto the leaving edges of the extrusion orifice.

References Cited

UNITED STATES PATENTS

| | | | |
|---|---|---|---|
| 2,878,521 | 3/1959 | Kenyon | 264—216 |
| 2,956,306 | 10/1960 | Conwell et al. | 264—178 |
| 3,121,915 | 2/1964 | Heller | 264—216 |
| 3,141,194 | 7/1964 | Jester | 264—216 |
| 3,277,277 | 10/1966 | Kesseler et al. | 264—216 |
| 3,374,303 | 3/1968 | Metz | 264—216 |

ROBERT F. WHITE, Primary Examiner

J. R. THURLOW, Assistant Examiner

U.S. Cl. X.R.

18—15; 264—93, 39, 102, 169, 216